(12) United States Patent
Liebelt

(10) Patent No.: US 6,236,306 B1
(45) Date of Patent: May 22, 2001

(54) TACTUAL ANNUNCIATING DEVICE FOR NOTIFYING VEHICLE OR MACHINERY STATUS OR CONDITION

(76) Inventor: Lyndon L. Liebelt, 10555 Montgomery NE., Suite 70 Albuquerque, NM (US) 87110

( * ) Notice: Subject to any disclaimer, the term of this patent is extended or adjusted under 35 U.S.C. 154(b) by 0 days.

(21) Appl. No.: 09/423,408
(22) PCT Filed: May 5, 1998
(86) PCT No.: PCT/US98/09178
§ 371 Date: Jan. 19, 2000
§ 102(e) Date: Jan. 19, 2000
(87) PCT Pub. No.: WO98/51018
PCT Pub. Date: Nov. 12, 1998

Related U.S. Application Data

(63) Continuation-in-part of application No. 60/045,880, filed on May 5, 1997.

(51) Int. Cl.[7] ....................................................... H04B 3/36
(52) U.S. Cl. .................. 340/407.1; 340/825.19; 340/965; 434/112; 434/113; 434/114; 455/344; 455/965
(58) Field of Search ........................... 340/401.1, 825.19, 340/965; 434/112–114; 455/344, 347, 351

(56) References Cited

U.S. PATENT DOCUMENTS

| | | |
|---|---|---|
| 3,618,070 * | 11/1971 | Kagan ................................ 340/407.1 |
| 3,618,080 | 11/1971 | Frey . |
| 3,623,064 | 11/1971 | Kagan . |
| 3,806,868 | 4/1974 | Portman . |
| 4,731,603 | 3/1988 | McRae et al. . |
| 4,918,438 | 4/1990 | Yamasaki . |
| 5,007,105 | 4/1991 | Kudoh et al. . |
| 5,218,340 | 6/1993 | Shannon, Jr. et al. . |
| 5,337,364 | 8/1994 | Fitch . |
| 5,392,032 | 2/1995 | Kline et al. . |
| 5,519,378 | 5/1996 | Queensbury . |
| 5,523,738 | 6/1996 | Fuller . |
| 5,547,382 | 8/1996 | Yamasaki et al. . |
| 5,619,181 | 4/1997 | Murray . |
| 5,663,703 * | 9/1997 | Pearlman ........................... 340/407.1 |
| 5,684,287 | 11/1997 | Walts . |
| 5,767,796 * | 6/1998 | Van Roekel et al. ................ 340/988 |

* cited by examiner

Primary Examiner—Julie Lieh
(74) Attorney, Agent, or Firm—Jeffrey D. Myers

(57) ABSTRACT

An apparatus for supplying tactile signals to the user of a vehicle or other machine to indicate the operational status or condition of the vehicle or machine, or a functional part thereof. A cam undergoes rotary movement within a flexible cylindrical wall having a corrugated inner surface, as with ridges of the like. The distal end of the cam contacts the inner surface as the cam rotates. The rotary motion of the cams modulated and regulated in response to output signals associated with operating conditions, for example, fluid pressure, engine speed, oil temperature, transmitted from corresponding sending units. The rotation of the cam causes periodic flexure of displacement of the wall which is palpable to the user. In one embodiment, the rotating cam causes one or more movable plungers to move to-and from in and out of the wall, also resulting in a tactile signal to the user. The cam may be driven by an electric motor which is responsive to the input signals.

10 Claims, 3 Drawing Sheets

TACTUAL ANNUNCIATING DEVICE FOR NOTIFYING VEHICLE OR MACHINERY STATUS OR CONDITION

CROSS-REFERENCE TO RELATED APPLICATIONS

This application claims the benefit of the filing of U.S. Provisional Patent Application Ser. No. 60/045,880, entitled Vehicle Operator Sensing Device, filed on May 5, 1997, and the specification thereof is incorporated herein by reference.

BACKGROUND OF THE INVENTION

1. Field of the Invention (Technical Field)

The present invention relates to annunciatory devices for operators of vehicles and machinery.

2. Background Art

To increase safety and efficiency, manufacturers have added a variety of annunciatory devices to vehicles and machinery to notify an operator of operating conditions such as, for example, fluid levels, engine speed, engine temperature, the functioning of turn indicators, the waking condition of a driver, process conditions in a manufacturing plant, and the like. Most of these devices use a distinct or a combination of auditory and visual signals to communicate with the operator.

Auditory annunciator devices generally use a hammer to strike a sounding surface or use a sound-producing vibrating reed. Usually, these devices are driven electromagnetically and actuated simultaneously with the onset of a certain condition. Visual annunciators function similarly in that an input signal is converted to a visual output. Typically, the annunciator is in communicative connection with the origin of the input signal, such as a thermostat, thermometer, tachometer, or the like. The input signal origin transmits a operating condition signal to the annunciatory device, which may be a bell, gauge, klaxon, or the like.

The following patents disclose previous efforts in related fields:

U.S. Pat. No. 3,618,080, entitled "Low-energy Input Buzzer," issued Nov. 2, 1971, to Frey, describes a vibratory buzzer device with a low-cost, low-energy vibratory mechanism for producing a relatively high sound output. The vibratory mechanism serves the sole purpose of striking a surrounding sounding shell. The vibrations do not interact with the operator other than through the sound produced.

U.S. Pat. No. 3,623,064, entitled "Paging Receiver Having Cycling Eccentric Mass," issued Nov. 23, 1971, to Kagan, describes an electrically driven vibrator which vibrates a radio-operated paging receiver at sub-audible frequency.

U.S. Pat. No. 3,806,868, entitled "Turn Signal Reminder Device," issued Apr. 23, 1974, to Portman, describes a device that emits a signal after the turn indicators have been activated for a predetermined period of time. The emitted signal then activates an audio indicator to alert the driver as to the status of the turn indicators.

U.S. Pat. No. 4,731,603, entitled "Tactile Alarm System for Gaining the Attention of an Individual," issued Mar. 15, 1988, to Mc Rae and McKenzie, describes an alarm system, requiring neither sound nor light for its operation, for gaining the attention of an individual. The device consists of a transmitter unit and a receiver unit having an induction coil. A mechanical agitator of selectable frequency and amplitude causes physical displacement of the receiver unit.

U.S. Pat. No. 4,918,438, entitled "Paging Receiver Having Audible and Vibratory Annunciating Means," issued Apr. 17, 1990, to Yamasaki, describes a paging receiver having an output device for driving both a tactile annunciator and an audible annunciator.

U.S. Pat. No. 5,218,340, entitled "Audible Turn Signal Canister Unit," issued Jun. 8, 1993, to Shannon, Jr. et al., describes an audio device that produces a 1000 to 2500 Hz pure tone upon activation of a vehicle's turn indicators.

U.S. Pat. No. 5,519,378, entitled "Motorcycle Turn Signal Override," issued May 21, 1996, to Queensbury, describes a handlebar mounted device operated by a three-pole toggle switch. The two end pole positions override the motorcycle's own turn indicator switching system while the center position is neutral. The invention also incorporates an audio indicator to alert the rider as to the status of the turn signals.

U.S. Pat. No. 5,523,738, entitled "Turn Indicator Safety Augmentor," issued Jun. 4, 1996, to Fuller, describes an audio device activated by a vehicle's turn indicators. The audio signal varies in intensity, duration, and frequency depending on the length of time that the indicator has been left on.

U.S. Pat. No. 5,547,382, entitled "Riding Simulation System for Motorcycles," issued Aug. 20, 1996, to Yamasaki et al., describes a vibratory mechanism for simulating engine vibration on a motorcycle riding simulation system. The vibratory mechanism, placed in the handle pipe of the motorcycle, consists of an eccentric weight connected to the shaft of an electrical motor. When activated the weight produces vibrations. A CPU controls the vibrations in a manner to mimic engine vibrations of an actual motorcycle. This mechanism produces the background vibration that a rider would experience if operating a real motorcycle. The Yamasaki device does not serve as an annunciatory or signal device.

U.S. Pat. No. 5,619,181, entitled "Vibratory Alerting Device with Audible Sound Generator," issued Apr. 8, 1997, to Murray, describes an alerting device that simultaneously generates a tactile vibration alert and an audible alert simultaneously. A vibrator motor includes a modified eccentric weight which becomes an efficient air mover thereby producing an audible signal.

U.S. Pat. No. 5,684,287, entitled "Bar Code Scanner with Tactile/Vibratory Signaling Means," issued Nov. 4, 1997, to Waits, describes a hand held bar code scanning device having a tactile feature in which the hand held device vibrates upon indication of a successful scan. A vibration motor causes the device to vibrate.

SUMMARY OF THE INVENTION (DISCLOSURE OF THE INVENTION)

The invention relates to annunciator devices, particularly to a tactile oscillatory annunciator apparatus. Broadly characterized, the invention is an apparatus for supplying tactile signals to the user of a vehicle or other machine to indicate the operational status or condition of the vehicle or machine, or a functional part thereof. In the preferred embodiment, a cam undergoes rotary movement within a flexible cylindrical wall having a corrugated inner surface, e.g. a wall with inwardly directed ridges or the like. The distal end of the cam contacts the inner surface as the cam rotates. The rotary motion of the cam is modulated or regulated in response to output signals associated with operating conditions, for example fluid pressure, engine speed, oil temperature, transmitted from corresponding sending units. The rotation of the cam causes periodic flexure or displacement of the wall which is palpable to the user. In one embodiment, the rotating cam causes one or more movable plungers to move to-and-fro in and out of the wall, also resulting in a tactile signal to the user. The cam may be driven by an electric motor which is responsive to the input signals.

Thus, there is provided in accordance with the invention an annunciation apparatus comprising a resilient substantially cylindrical wall comprising a corrugated inner surface and an outer surface, a rotatable cam disposed within the wall and contactable with the corrugated inner surface of the wall, and drive means for rotating the cam, wherein rotation of the cam contacts the cam with the corrugated inner surface to induce radially outward displacement of an arcuate section of the resilient wall. The means for rotating may comprise an electric motor. The cam may be constantly in contact with the inner surface, or the corrugated inner surface may have uniformly radially spaced ridges, and the cam periodically contacts the ridges.

Also in accordance with the invention there is provided an annunciatory apparatus comprising a substantially cylindrical wall comprising an inner surface and an outer surface, the wall defining at least one hole between the inner surface and the outer surface, a plunger movably disposed within the at least one hole, the plunger having a proximate end and a distal end, a rotatable cam disposed within the wall and contactable with the proximate end of the plunger, and a drive means for rotating the cam within the wall, wherein rotation of the cam periodically contacts the cam with the proximate end of the plunger to induce radially outward displacement of the plunger.

Alternatively, there is provided an annunciator apparatus comprising, a substantially cylindrical wall, a mass, and a drive means for moving the mass through a range of vibrational frequencies, wherein movement of the mass induces a range of vibrational frequencies in the substantially cylindrical wall. The drive means may be a solenoid. The mass may be an eccentric mass supported for cyclical movement. The invention preferably includes means for transmitting a signal from an origin to the drive means, wherein the means for transmitting comprises a member selected from a group comprising a conductive wire, a rotatable cable, a translatable cable, a magnet, and electromagnetic radiation.

The apparatus of the invention may be used in conjunction with a handle pipe, a steering wheel, a tiller, a shift lever, or an operator control lever.

A primary object of the present invention is to provide an annunciating means for communicating information relevant to vehicle and machine operation.

Another object of the invention is to provide an annunciator apparatus which transmits information to the operator by means of tactile signals.

A primary advantage of the present invention is that the apparatus communicates in environments regardless of background noise or lighting levels.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
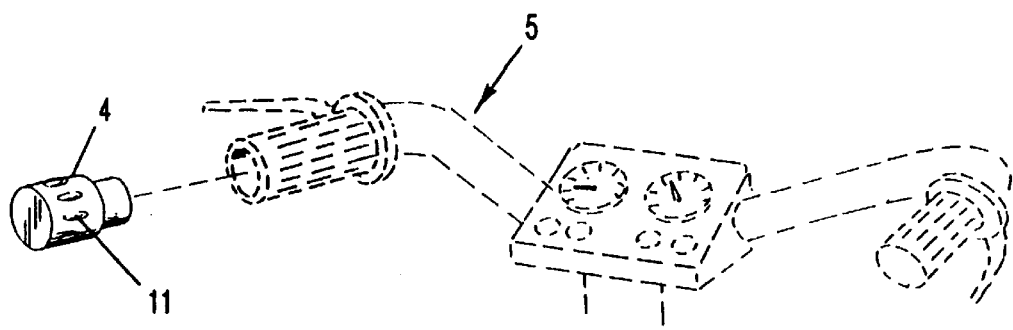
FIG. 1 is a perspective view of an oscillatory annunciatory apparatus according to the invention, shown to be insertable into the handlebar of a motorcycle.

DESCRIPTION OF THE PREFERRED EMBODIMENTS (BEST MODES FOR CARRYING OUT THE INVENTION)

The present invention relates to an annunciatory apparatus, particularly to an oscillatory annunciatory apparatus which provides tactile signals to the user. By tactile signal, the operating condition or status of, for example, a vehicle or machine may be communicated to the user without the user having to see or hear. Automobiles, trucks, motorcycles, aircraft, and ships typically use auditory and visual indicators as annunciatory devices. In addition, many pieces of industrial equipment provide operators with an array of auditory or visual signals. All of these fields may benefit from the use of oscillatory apparatuses as annunciatory devices. The oscillatory annunciatory apparatus may signal the operator under circumstances where the auditory and visual indicators fail to communicate. When the intensity of the ambient sound level is high, auditory indicators communicate poorly since their signal cannot be distinguished easily from the background sound. When the intensity of ambient light is high, contrast between a visual indicator and its background decreases. The decrease in contrast reduces the light indicator's effectiveness at communicating information to the operator. The oscillatory annunciatory apparatus fails to communicate only when the background vibration masks the indicator's output. However, just as "smart" video screens adjust brightness and contrast to compensate for background light intensity, smart oscillatory annunciatory apparatus may adjust their frequency or intensity to distinguish themselves from the background vibration. Alternatively, a range of frequencies may be swept to ensure that the indicator distinguishes itself from any background noise.

For vehicles, oscillatory annunciatory apparatuses present an alternative to auditory and visual annunciatory devices. Oscillatory annunciatory apparatuses may prove more useful on some vehicles than on others. For instance, auditory and visual indicators work to a lesser degree when used on motorcycles. First, the higher level of engine and road noise, compared to that experienced in the passenger compartment of an automobile, necessitates a higher intensity auditory reminder signal. Second, in comparison to the breadth of an automobile dash board, motorcycles have a limited cockpit area in which to locate visual indicators. And third, motorcyclists must focus more closely on road conditions than an automobile driver, thus, allowing less time to check cockpit information. Accordingly, the present invention finds beneficial application upon motorcycles, although such an application is by way of example and not militation. The invention may be used in conjunction with a wide variety of vehicles, manufacturing devices, and other machines.

Under certain conditions, application of an oscillatory annunciatory apparatus to an auto or truck steering wheel may enhance road safety. For instance, in the case of a hearing impaired driver, auditory signals have little use. Also, the oscillatory annunciatory apparatus may help communicate information during use of a vehicle's entertainment sound system. For convertible automobiles, bright sun may decrease the contrast between the indicator light and the background. Thus, an oscillatory annunciatory apparatus, perhaps as an auxiliary device, may compensate for a visual device's inability to notify the driver of certain conditions.

The present invention describes an alternative to auditory and visual annunciatory indicators, the oscillatory annunciatory apparatus. Positioned on a motorcycle's handle bars, on a steering wheel of a vehicle, on a shift lever or knob, or the like, the oscillatory annunciatory apparatus alerts a driver as to the status of current operating and other conditions. The oscillatory annunciatory apparatus may operate at an unlimited number of frequencies and combinations of frequencies. The frequency or frequencies may vary over time or with respect to the degree of change in the operating conditions. Frequency adjustments may occur based on sophisticated algorithms tied to at least one input. Thus, the same oscillatory annunciatory apparatus may communicate information from disparate input sources. Communication from a condition signal source to the inventive oscillatory annunciatory apparatus may occur through mechanical, electrical or electromagnetic transmission.

Referring generally to the drawing figures, the invention includes an oscillatory apparatus 4 which provides tactile signals to the user. The apparatus may be installed, for example, in and on the pipe 5 constituting the handlebar of a motorcycle, as depicted in FIG. 1. The oscillatory apparatus 4 receives input signals 2 from one or more condition sensors of generally known construction and type, e.g. sending units for converting temperature or pressure into electrical signals, or for example a tachometer, or the like. The sensor information may be transmitted mechanically, e.g. by rotating cable, but in the preferred embodiment the signal transmission is in the form of electrical input. The input signal 2 optionally, but preferably is processed by a frequency logic generator 1 of known construction which then supplies an output 3 to the oscillator 4. The operation of the oscillator is modulated or regulated by the output signals 3 thereby to convey a tactile signal to the operator's hand or other suitable body part, as described further below.

Figure 4:
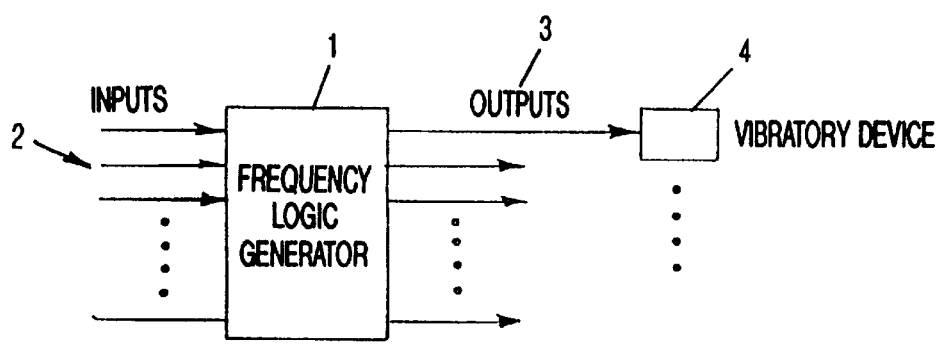
FIG. 4 is a block diagram of the logical structure of the apparatus' operation according to the invention.

Reference is made to FIG. 4. In the preferred practice of the invention, a logic circuit 1, of known construction, converts inputs 2 from various instrumentalities to a output signal 3. For example, the input signal 2 to the logic circuit 1 may originate from signal outputs from a tachometer, a depth meter, a turn indicator, a head position monitor, a thermometer, a scale, or a radio. The logic circuit 1 converts the input signal 2 to an output signal 3 that induces oscillatory apparatus 4 to produce a range of vibrational frequencies. Transmission of the output signal 3 to the apparatus may occur through a variety of methods including a conductive wire, a rotatable cable, a translatable cable, a magnet, and electromagnetic radiation. Thus, the logic circuit 1, the input signal 2 and the output signal 3 need not be limited to operation by electricity. Preferably, the cam 10 may be driven by an electric motor 12 which is responsive to the output signals 3, such that the revolutions of the motor 12 are varied in response to the received signal 3. Output signals 3 connect to at least one oscillatory 4 apparatus which communicates information to a vehicle's operator, or other passengers within the vehicle, or to a machine operator.

The manner of communication may also drive the apparatus, for example, the output signal 3 may take the form of an electrical current caused by a voltage potential. A conductive wire carrying the output signal 3 may form a solenoid coil at the oscillatory apparatus. The solenoid creates a magnetic field that translates a mass in an oscillatory fashion. The oscillating mass thereby produces a range of vibrational frequencies that produce a tactile sensation in the body of the operator. The output signal 3 alternatively is connected to an electric motor 12. The electric motor may, for example, move an eccentric mass. The moving eccentric mass may produce a range of vibrational frequencies that produce a tactile sensation in the body of the operator. The apparatus may be disposed within or in contact with various parts of the vehicle or machine including a handle pipe, a steering wheel, a tiller, a shift lever, an operator control lever, and an aircraft control stick.

Figure 2:
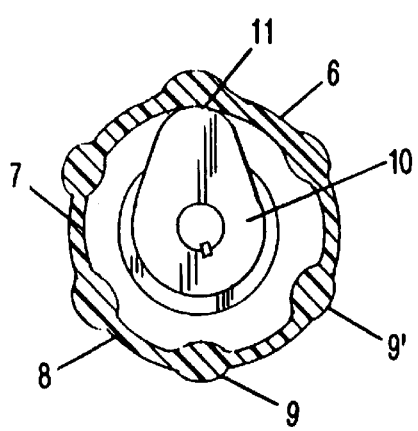
FIG. 2 is a radial cross section view of a first embodiment of the apparatus shown in FIG. 1.
Figure 3:
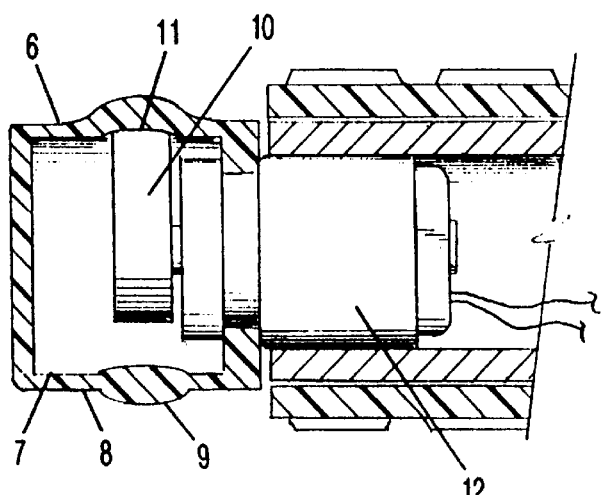
FIG. 3 is an axial cross section view of a first embodiment of the apparatus shown in FIG. 1.

As seen in FIG. 1, the invention includes an oscillatory apparatus 4 which may be mounted, for example, in a handle pipe 5. As seen in FIGS. 2 and 3, the preferred embodiment of the apparatus 4 features a cylindrical wall 6 made of resilient material, such as an elastomeric plastic, having a corrugated inner surface 7 and an outer surface 8. "Corrugated" in this context means that the inside diameter of the cylindrical wall 6 is not uniform, but rather manifests an uneven profile, preferably a profile or contour having minor protrusions, ridges, ribs or rimples disposed at periodic spaced intervals around the inner surface 7. In the preferred embodiment, the inner surface 7 and outer surface 8 have common ridges 9, which preferably, but not necessarily, are uniformly radially disposed around the axis of the cylindrical wall 6. A rotatable cam 10 is located within the cylindrical wall 6, and preferably rotates eccentrically about a fixed axis of rotation which is coaxial with the axis of the cylindrical wall 6. Cam 10 and has a distal end 11 that successively engages the ridges 9 on the inner surface 7 as the cam rotates. In the preferred embodiment, the cam 10 is rotated by an electric motor 12. The rotating cam 10, through successive engagement with the ridges 9, induces elastic, radially outward, translational displacement of an arcuate section of the resilient cylindrical wall 6. When the distal end of the cam 10 contacts the inner side of a ridge 11, a short arcuate section of the wall 6 in the immediate vicinity of the ridge 11 flexes or moves outward, immediately but temporarily, to produce a palpable "bump" on the outer surface 8 of the wall 6. When the distal end of the cam 10 rotates past and disengages from a particular ridge 11, the wall 6 at that point immediately returns to its rest state, and the palpable bump is reduced or vanishes. Consequently, as the cam 10 rotates, the operator feels the oscillating ridges 9 as they successively protrude and rebound around the circumference of the outer surface 8 of the resilient plastic wall 6. The operator thereby perceives the tactile sensation of a traveling or oscillating ridge or bump that repeatedly and circuitously moves within his grip.

The cam 10 may constantly be in contact with the inner surface 7. Alternatively, and to reduce wear, where the corrugated inner surface 7 comprises uniformly radially spaced ridges, the cam 10 in its rotary motion periodically contacts the ridges 11, but does not "ride" along the inner surface 7.

Figure 8:
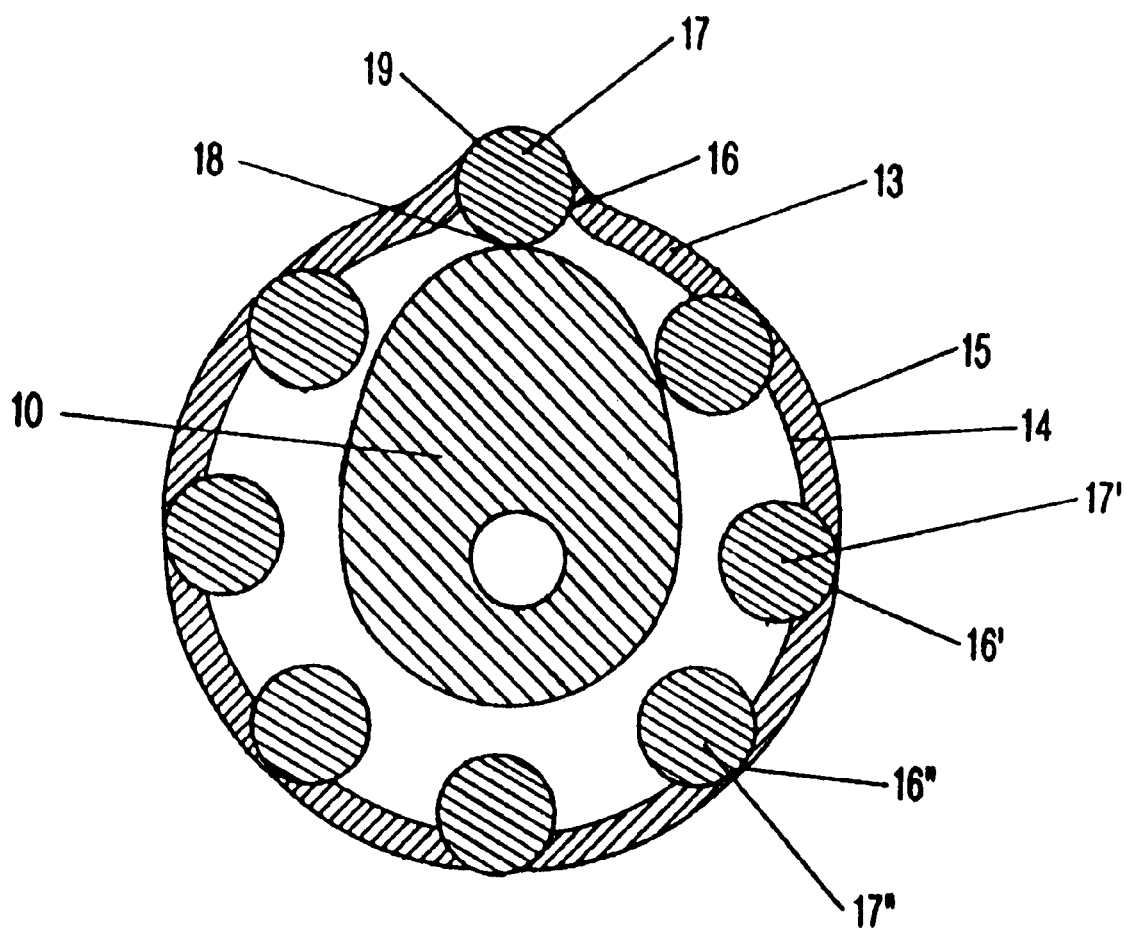
FIG. 8 is a radial cross section view of an alternative embodiment of the invention shown in FIG. 1.

As seen in FIG. 8, an alternative embodiment of the invention is an oscillatory apparatus 4 variant of that shown in FIGS. 2 and 3. Again, the apparatus may be mounted, for example, in a handle pipe 5. The apparatus has a cylindrical wall 13 having an inner surface 14 and an outer surface 15. The cylindrical wall 13 is penetrated by at least one hole 16, and preferably by a plurality of uniformly radially located holes 16, 16', 16" between the inner surface 14 and the outer surface 15. A plunger 17, e.g. a ball bearing, is disposed and held in each hole 16; preferably a radial array of plungers 17, 17', 17' are disposed and held within respective holes 16, 16', 16". Each plunger 17 has a proximate end 18 and a distal end 19. A rotatable cam 10 disposed within the cylindrical wall 13 an driven, for example, by an electric motor 12 periodically contacts the proximate end 18 of the one plunger 17, or in periodic succession contacts the respective proximate ends of the plungers 17,17', 17". The rotating cam 10, through successive engagement with the proximate ends 18 of the plungers 17, induces radial translational movement of the of the plungers 17. As each of the plungers this is displaced radially outward, it projects out through its corresponding hole 16 as seen in the uppermost portion of FIG. 8. The plungers 17, 17', 17" have diameters less than the diameters of their corresponding holes 16, so that the wall 13 hold the plungers in position and prevents them form being expelled through the holes by the action of the cam 10. The resiliency of the wall 13 biases the plungers 17, 17', 17" radially inward, so that when the cam 10 is not in contact with a particular plunger 17", that plunger protrudes slightly or not at all through the hole 16" and is substantially flush with the outer surface 15, as seen in the lower portions of FIG. 18. Thus, as the cam 10 rotates, the operator feels the oscillating distal ends 19 of the plungers 17 as they successively protrude from and withdraw into the holes 16, 16', 16" in the outer surface 15 of the cylindrical wall 13.

In other embodiments, a cam 10 or other bulk body may act as a moving mass directly in contact with the cylindrical wall. A drive means such as a motor or rotating cable, moves the mass through a range of vibrational frequencies, such that movement of the mass induces a range of vibrational frequencies in the wall 13.

Thus, in all embodiments, there is means for transmitting an output signal 3 from an origin to the cam 10 or other movable mass. This transmission may be accomplished by way, for example, of a conductive wire, a rotatable cable, a translatable cable, a magnet, and electromagnetic radiation.

The apparatus of the invention is particularly useful on motorcycles, where visual and auditory annunciators are hampered by ambient driving conditions. Thus, as seen in FIG. 1, the oscillator annunciator 4 is mountable on the end of, or integrated into, the handlebar of a motorcycle. The apparatus 4 is there able to signal the user that, for example, his turn signal is actuated. On motorcycles, as on many motor vehicles, a turn signal occasionally inadvertently is actuated, or remains active, despite the fact that the wheel is not turned. By the apparatus of the invention, the user is warned against the possibility of a false turn signal to other vehicle operators, a potentially hazardous situation for the cyclist. The input signal 2 may be as simple as a positive voltage that is imposed when the turn signal is active, which voltage signal is transmitted as a positive output 3 to the annunciator apparatus 4 so that the annunciator 4 oscillates when the turn signal is on. Alternatively, the annunciator 4 may be wired directly to the turn signal element itself, so that the annuciator 4 oscillates only when the turn signal light is on, i.e. the annunciator "blinks" in time with the blinking of the turn signal light. Accordingly, the motorcycle operator quickly learns to expect his "handle grip" to vibrate or oscillate only during turns i.e. while the turn signal is activated. The operator becomes conditioned to affirmatively deactivate the turn signal in those instances when he feels the annunciator 4 oscillating long after a turn has been completed, or when he is otherwise in a straight line of travel. In this example, it is desirable, but not necessary, that there be provided a timing element, in circuit 1 or a timer of known construction in communication with the turn signal itself, that disengages the annunciator apparatus 4 after a predetermined activation period. By such means, the annunciator shuts off after an adequate signal has been transmitted to the user.

The apparatus 4 of the invention may be a feature of a manufactured item, or may be provided as an after-market device for installation by the user. For example, an original equipment annunciator 4 may be permanently integrated with the handlebar of a motorcycle, while an aftermarket embodiment may be in the form of a specialized grip that replaces an original manufacturer's component. Also, it is appreciated by one skilled in the art that the apparatus 4 may be located in the motorcycle seat or in the cycle's foot pegs, and still function to convey operational conditions data.

Figure 5:
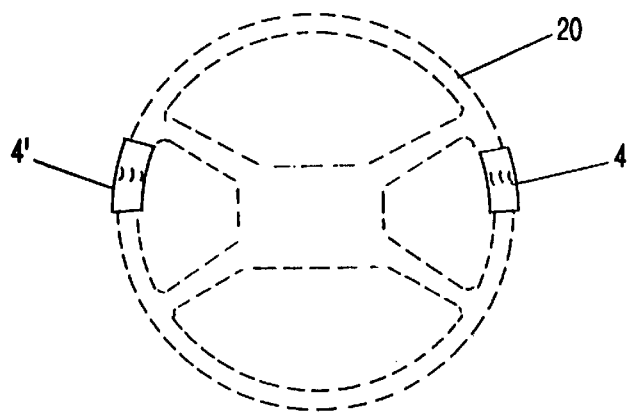
FIG. 5 is a front elevation view two oscillatory annunciatory apparatuses according to the invention mounted on a steering wheel.

FIG. 5 shows that the oscillatory annunciatory apparatus 4 may be mounted to a steering wheel 20 of an automobile or other vehicle or machine. As depicted, the apparatuses 4, 4' may be used in pairs. One apparatus 4 may be used to communicate one operating condition (e.g. vehicle velocity) while the other 4' annunciates a wholly unrelated condition (e.g. fuel remaining). The configuration and number of oscillatory annunciatory apparatuses may vary depending on need.

Figure 6:
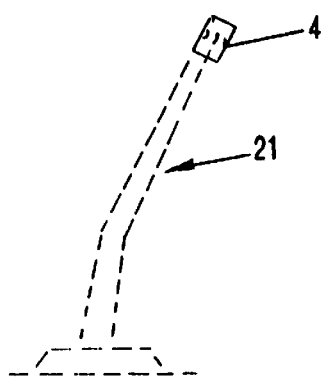
FIG. 6 is a side elevation view of an oscillatory annunciatory apparatus according to the invention mounted on a shift lever.

In FIG. 6, an annunciatory apparatus 4 is shown mounted to a shift lever 21. The oscillatory annunciatory apparatus 4 may, for example, alert an operator as to whether a gear change is proper. An oscillatory annunciatory apparatus 4 signals that the gear shift is proper by, for example, the frequency of the tactile sensations perceived by the operator's hand. If no oscillation or vibration is felt, the operator should reconsider the gear change. It is apparent that an apparatus 4 may be used in conjunction with, for example, a gear shift 21 device to indicate the operative condition associated with that device, i.e. the need to shift gears; alternatively, the apparatus 4 may be mounted upon a device such as a gear shift 21 for the sake of convenience, even though the operative condition (e.g. oil pressure) may be unrelated to the function of the device 21.

Figure 7:
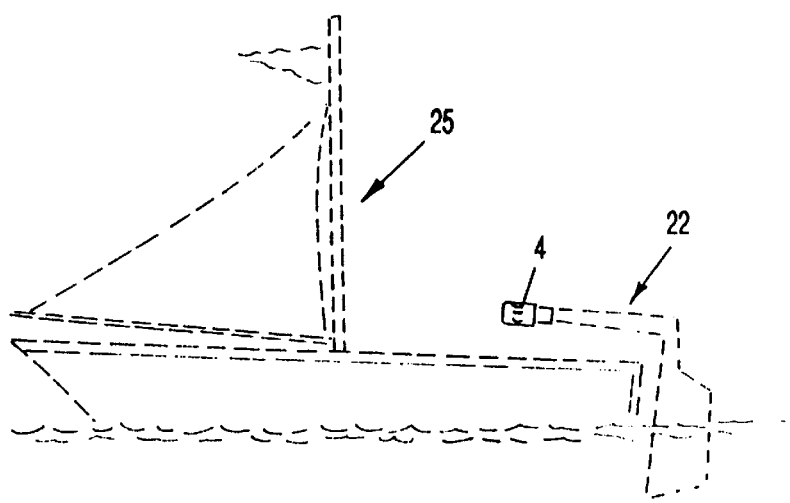
FIG. 7 is a side elevation view of an oscillatory annunciatory apparatus according to the invention mounted on a sailboat tiller.

Similarly, one or more oscillatory annunciatory apparatus 4 may be mounted to the tiller 22 of a boat 25, as seen in FIG. 7. The oscillatory annunciatory apparatus may alert the operator as to information regarding water depth, weather, or incoming radio communications, or the like.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An annunciation apparatus for a motor vehicle, said apparatus comprising:

a resilient substantially cylindrical well incorporated as part of the motor vehicle and grasped by a hand of a user of the motor vehicle when the motor vehicle is being operated, said wall comprising a corrugated inner surface comprising a plurality of corrugations and an outer surface;

a rotatable cam disposed within said wall and contactable with said corrugated inner surface of said wall;

drive means for rotating said cam; and means for receiving a motor vehicle status signal thereby causing said annuciator to annuciate thereby indicating an operating condition of the motor vehicle;

wherein rotation of said cam contacts said cam with said corrugated inner surface to induce radially outward displacement of an arcuate section of said resilient wall.

2. An annunciation apparatus according to claim 1, wherein said means for rotating comprises an electric motor.

3. An annunciation apparatus according to claim 1 wherein said cam is constantly in contact with said inner surface.

4. An annunciation apparatus according to claim 1 wherein said corrugated inner surface comprises uniformly radially spaced ridges, and said cam periodically contacts said ridges.

5. An apparatus according to claim 1, wherein said substantially cylindrical wall comprises a member selected from the group consisting of handle pipes, steering wheels, tillers, shift levers, and operator control levers.

6. An annunciation apparatus for a motor vehicle, said apparatus comprising:

a substantially cylindrical wall incorporated as part of the motor vehicle and grasped by a hand of a user of the motor vehicle when the motor vehicle is operated, said wall comprising an inner surface and an outer surface, said wall defining at least one hole between said inner surface and said outer surface;

a plunger movably disposed within said at least one hole, said plunger having a proximate end and a distal end;

a rotatable cam disposed within said wall and contactable with said proximate end of said plunger;

drive means for rotating said cam within said wall; and means for receiving a motor vehicle status signal thereby causing said annunciator to annuciate thereby indicating an operating condition of the motor vehicle;

wherein rotation of said cam periodically contacts said cam with said proximate end of said plunger to induce radially outward displacement of said plunger.

7. An annunciator apparatus for a motor vehicle, said apparatus comprising:

a substantially cylindrical well incorporated as part of the motor vehicle and grasped by a hand of a user of the motor vehicle when the motor vehicle is being operated;

a mass contacting said cylindrical wall;

a drive means for moving said mass through a range of vibrational frequencies; and means for receiving a motor vehicle status thereby causing said annunciator apparatus to annunciate thereby indicating an operating condition of the motor vehicle;

wherein movement of said mass induces a range of vibrational frequencies in said substantially cylindrical wall.

8. An apparatus according to claim 6 wherein said substantially cylindrical wall comprises a member selected from the group consisting of handle pipes, steering wheels, tillers, shift levers, and operator control levers.

9. An apparatus according to claims 7, in which said mass comprises an eccentric mass supported for cyclical movement.

10. A method of indicating that a motor vehicle signal status is active, the method comprising the steps of:

a) providing a substantially cylindrical wall incorporated as part of the motor vehicle and grasped by a hand of a user of the motor vehicle when the motor vehicle is being operated, the wall comprising a member selected from the group consisting of handle pipes, steering wheels, tillers, shift levers, and operator control levers; and b) when the motor vehicle status signal is active, inducing a range of vibrational frequencies in the substantially cylindrical wall, thereby indicating an operating condition of the motor vehicle.

* * * * *